US012391057B2

(12) United States Patent
Patel

(10) Patent No.: US 12,391,057 B2
(45) Date of Patent: Aug. 19, 2025

(54) WIRE STITCHING APPARATUS WITH MISSING STAPLE PIN DETECTION MECHANISM

(71) Applicant: Udaykumar Chhabildas Patel, Gujarat (IN)

(72) Inventor: Udaykumar Chhabildas Patel, Gujarat (IN)

( * ) Notice: Subject to any disclaimer, the term of this patent is extended or adjusted under 35 U.S.C. 154(b) by 0 days.

(21) Appl. No.: 18/723,054

(22) PCT Filed: Dec. 21, 2022

(86) PCT No.: PCT/IN2022/051110

§ 371 (c)(1),
(2) Date: Jun. 21, 2024

(87) PCT Pub. No.: WO2023/119328

PCT Pub. Date: Jun. 29, 2023

(65) Prior Publication Data

US 2025/0050676 A1 Feb. 13, 2025

(30) Foreign Application Priority Data

Dec. 21, 2021 (IN) ............................. 202121059791

(51) Int. Cl.
*B42B 4/02* (2006.01)

(52) U.S. Cl.
CPC ..................................... *B42B 4/02* (2013.01)

(58) Field of Classification Search
CPC ........................................................ B42B 4/02
See application file for complete search history.

(56) References Cited

U.S. PATENT DOCUMENTS

| | | | | |
|---|---|---|---|---|
| 7,159,748 B2 * | 1/2007 | Gerlach | B42C 1/12 227/111 |
| 7,537,144 B1 * | 5/2009 | Marcinik | B65H 63/086 227/86 |
| 7,658,308 B2 * | 2/2010 | Hori | B42B 4/00 227/86 |
| 2015/0063953 A1 * | 3/2015 | Taguchi | B42C 1/12 412/37 |
| 2019/0321998 A1 * | 10/2019 | Patel | B27F 7/17 |

FOREIGN PATENT DOCUMENTS

| | | |
|---|---|---|
| JP | S60240497 A | 11/1985 |
| JP | H0256365 A | 2/1990 |
| JP | 2011068478 A | 4/2011 |
| WO | 2018087783 A1 | 5/2018 |

* cited by examiner

*Primary Examiner* — Nathaniel C Chukwurah
(74) *Attorney, Agent, or Firm* — Hayes Soloway PC

(57) ABSTRACT

The present invention relates to wire stitching apparatus with missing staple pin detection mechanism. In present invention, the stitching head is connected with a negative terminal of the power supply box and the positive terminal of the power supply box is supplied to the relay. The negative terminal of the relay is supplied to the lower clincher. During stapling, the stitching head comes in contact with the clincher that completes the circuit due to metallic contact between the stitching head and the clincher. Thus, an electrical signal is provided to the relay from the power supply box. Hence, the relay gets electrical signal only when the pinning is done. Now, in absence of metallic contact between head and the clincher, the relay will not get signal. In such situation, the PLC generate fault to detect the missing staple pin.

7 Claims, 5 Drawing Sheets

WIRE STITCHING APPARATUS WITH MISSING STAPLE PIN DETECTION MECHANISM

FIELD OF THE INVENTION

The present invention is generally relates to wire stitching apparatus for stitching/binding print products i.e. paper sheets and more particular it relates to a wire stitching apparatus with missing staple pin detection mechanism for easy detection of fault by detecting missing staple pin in the print product to ensure consistent product quality.

BACKGROUND OF THE INVENTION

In the bookbinding process, multiple pages in the bound state are impositioned on one sheet of printing paper and printed, and the pages are folded so as to form a signature, and the number of pages is increased according to the number of pages of the book. Collating is performed by stacking the signatures of the above, binding them by either method, and trimming the other three sides without binding by cutting.

As a method of binding the signatures, there is a method of using bonds, threads, wires, etc., but for magazines and catalogs with a relatively small number of pages, both ends of the U-shaped wire are the signature spines. Wire stitching machine is used in which the wire is driven so as to penetrate from the side to the inside, and the tips of the wires protruding inward are bent and molded so as to face each other.

Generally, such wire stitching machine for binding sheets comprises a stitching head having wire advancing and cutting mechanism for pulling the length of wire from the spool and applying on the paper sheet to stitch.

With the continuous improvement of printing technology, especially the improvement of factory automation, people have put forward higher requirements for the processing quality and efficiency of post-printed products. At the same time when the staple process is going on, carry difficulties to find out the missing staple.

The above set up of stitching machine carries difficulties to find out the missing staple of the particular book or paper sheets. The existing binding machines sometimes still have missing orders. If they cannot be found in time, these unqualified products will be sent to the book delivery mechanism of the binding machine and enter the next production process as qualified products.

Hence, a need exists for accurately and cost effective detection of missing staple pin in sheets binding machine.

OBJECT OF THE INVENTION

The main object of the present invention is to provide a wire stitching apparatus with missing staple pin detection mechanism for easy detection of fault by detecting missing staple pin in the sheets.

One more object of the present invention is to provide a missing order detection system for a binding machine with high accuracy and high efficiency with effective cost.

Yet, another object of the present invention is to provide a wire stitching apparatus with missing staple pin detection mechanism that detects the number of staples of the current signature after binding in real time, and generate the number of staples signal output.

SUMMARY OF THE INVENTION

The present invention relates to a wire stitching apparatus with missing staple pin detection mechanism for easy detection of fault by detecting missing staple pin in the print product to ensure consistent product quality. In present invention, the stitching head is connected with a negative terminal of the power supply box and the positive terminal of the power supply box is supplied to the relay. The negative terminal of the relay is supplied to the lower clincher. During stapling, the stitching head comes in contact with the stitching clincher that completes the circuit due to metallic contact between the head and the stitching clincher. Thus, an electrical signal is provided to the relay from the power supply box. Hence, the relay gets electrical signal only when the pinning operation is done. Now, in absence of metallic contact between stitching head and the stitching clincher, the relay will not get signal. In such situation, the PLC is configured to generate fault signal if the negative supply from the stitching head being not supplied to the relay through the stitching clincher. At same time PLC sending the signal to HMI screen, said HMI screen showing the particular fault, at time indicator lamps is ON and buzzer is signaling. According, the present invention provides a missing order detection system for a binding machine with high accuracy and high efficiency with effective cost.

BRIEF DESCRIPTION OF THE DRAWINGS

Other objects, advantages and novel features of the invention will become apparent from the following detailed description of the present embodiment when taken in conjunction with the accompanying drawings.

DETAILED DESCRIPTION OF THE INVENTION

Before explaining the present invention in detail, it is to be understood that the invention is not limited in its application to the details of the construction and arrangement of parts illustrated in the accompanied drawings. The invention is capable of other embodiments, as depicted in different figures as described above and of being practiced or carried out in a variety of ways. It is to be understood that the phraseology and terminology employed herein is for the purpose of description and not of limitation.

It is to be also understood that the term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Figure 1:
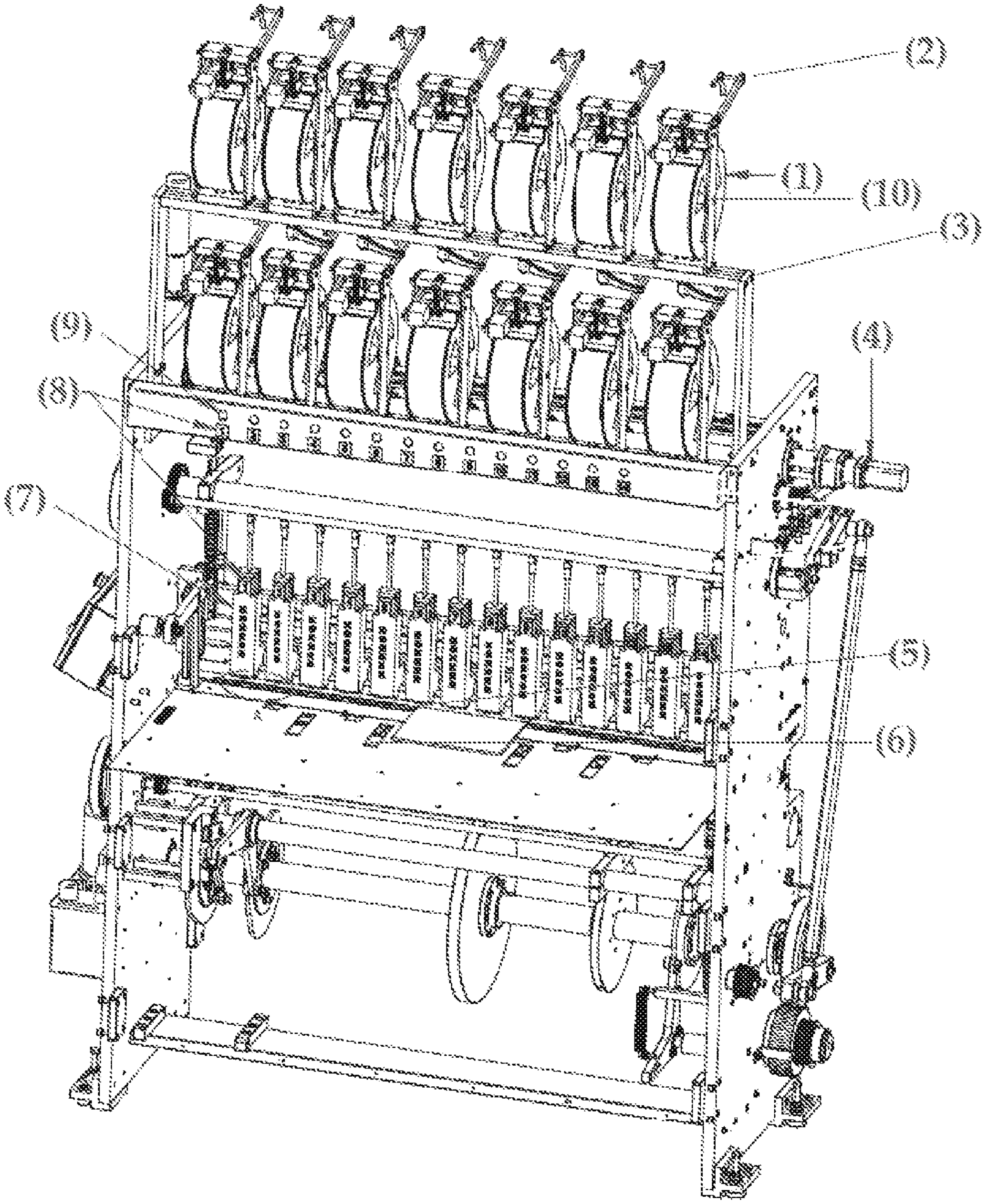
FIG. 1 shows a perspective the front view of the wire stitching apparatus according to the present invention.
Figure 2:
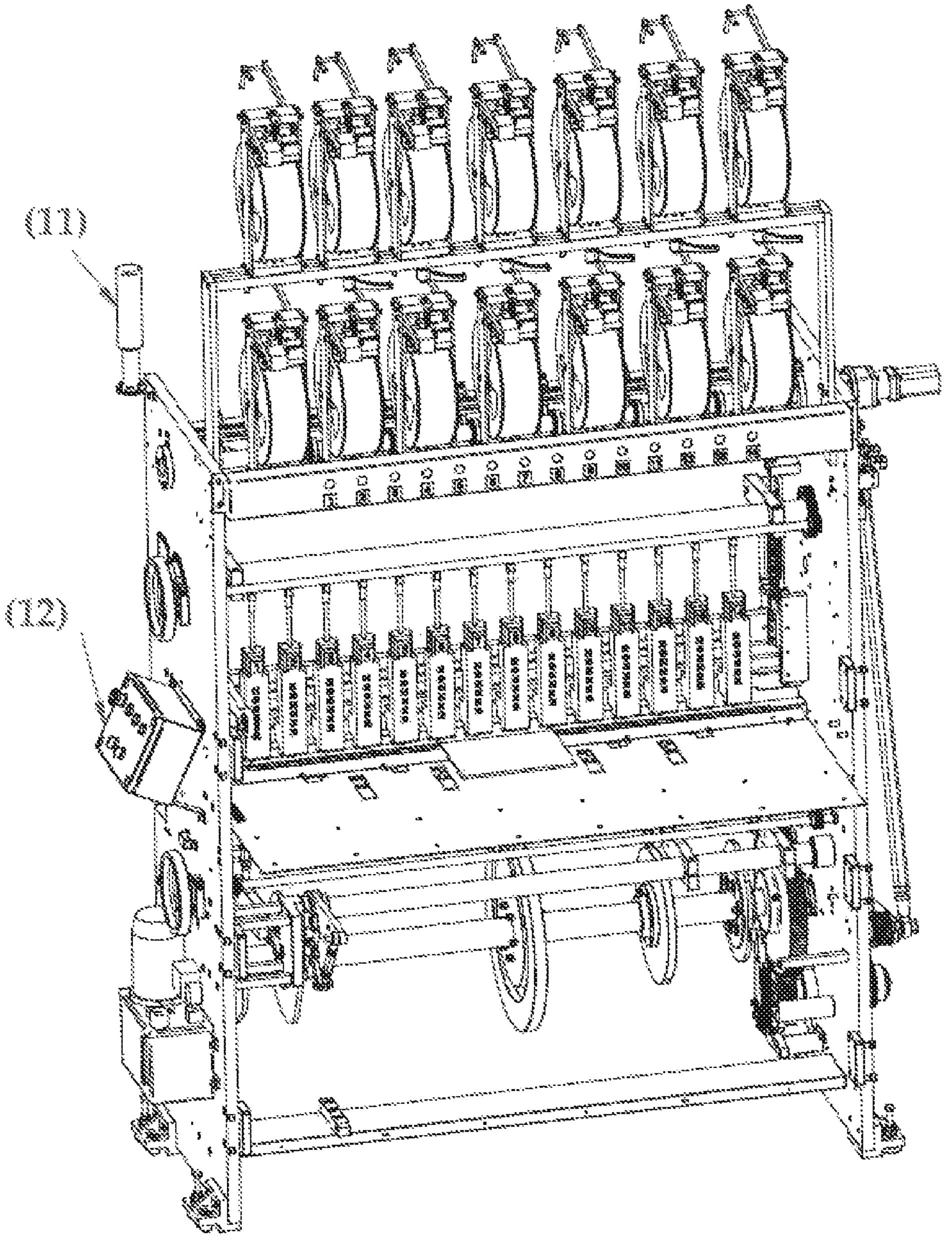
FIG. 2 shows a perspective rear of view of the wire stitching apparatus according to the present invention.
Figure 3:
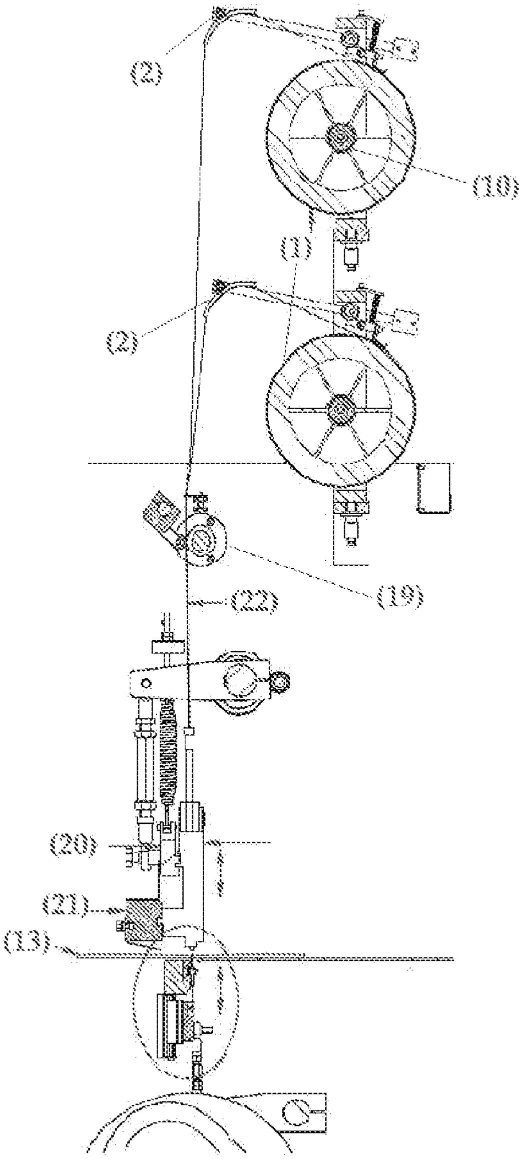
FIG. 3 shows illustrates of schematic view the wire stitching apparatus with missing staple pin detection mechanism according to the present invention.

Now as illustrated in FIGS. 1, 2 and 3, a wire stitching apparatus according to present invention comprises a top frame (3), a servo controlled wire puller (4) disposed below said frame (3) and a lower platform (5) located below the wire puller (4) that receives the bunch of sheets (13).

Referring continues with FIGS. 1 and 2, said top frame (3) comprises a plurality of linearly arranged rotatable wire spools (1) whereon stapling material (22), for example, wire (shown in FIG. 3), is wound. Said wire (22) is preferably made of metal. Said wire spools (1) are rotated with respect to an elongated spindle (10) being longitudinally and centrally extended through the wire spools (1) when the wire (22) is pulled. Said wires (22) are fed vertically and parallelly downward from respective wire spools (1) by passing through their corresponding guide channel (2).

Now as shown in FIGS. 1 and 3, said lower platform (5) comprises a plurality of linearly arranged stitching heads (7) wherein wires (22) extended from the respective pulling rollers (19) are properly threaded therein (respective stitching head (7)). Said stitching heads (7) are perpendicularly applied on the sheets (13) along the conveying path of the sheets (13) so that the sheets (13) are stapled from above. Said stitching head (7) comprises a staple-forming and driving mechanism for advancing said wire (22) therethrough along the longitudinal axis thereof and performing stapling operation upon the pulled wire (22) received from respective wire pulling roller (19). The sheets (13) to be stitched are positioned beneath the stitching head (7). The stitching head (7) is having a stitching area (6). Said stitching head (7) having an oscillating stitching head holder (20) and a stationary stitching head holder (21) (as shown in FIG. 3).

The stitching apparatus according to present invention further comprises a stitching clincher disposed on the opposite side of the stitching head (7) to support the sheets (13). Said stitching head (7) drives wire (22) into the set of sheets (13) and bend the wire (22) into the U-shape to bind the sheets (13). Said stitching head (7) is arranged oppositely to the stitching clincher for reciprocal vertical movement between a standby position in which it is upwardly separated from the stitching clincher and a stitching position in which it abuts to the stitching clincher.

In present embodiment, it is described that the product to be stitched is held by single stitching head (7). However, the product to be stitched may be held by more than one stitching head (7).

Figure 4:
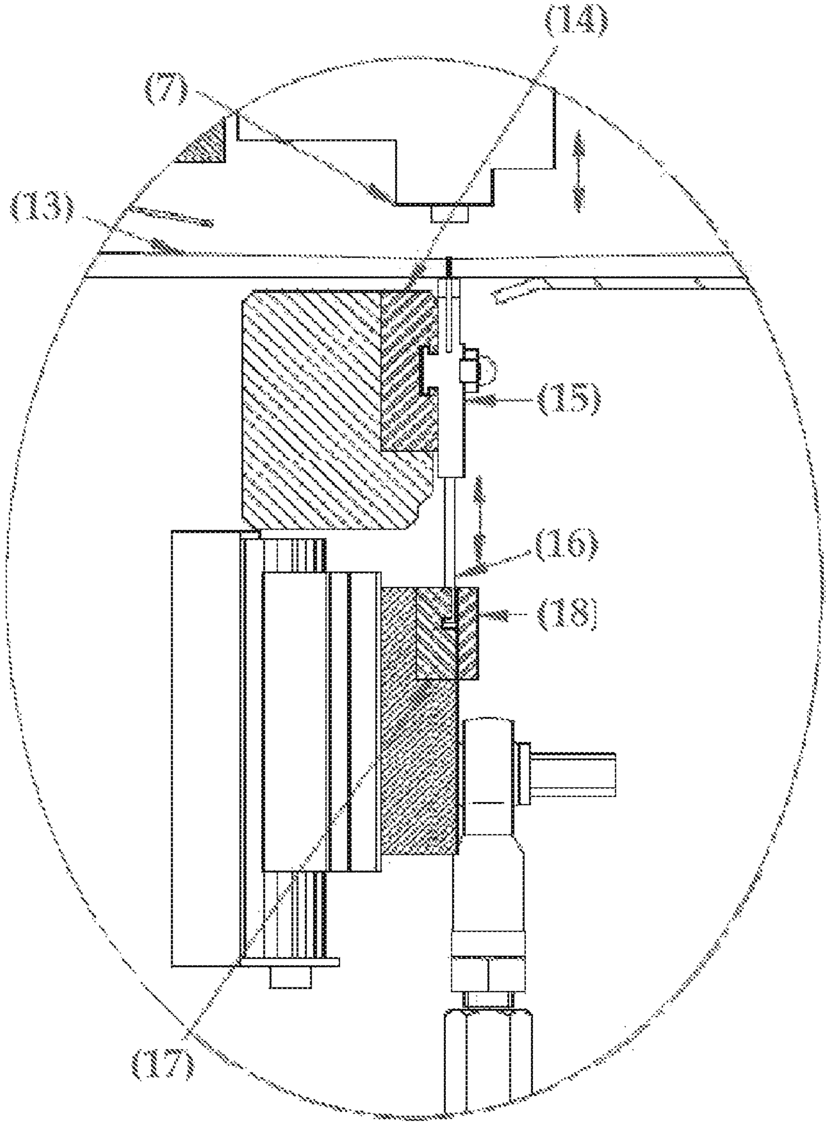
FIG. 4 shows illustrates of schematic view of stitching head and stitching clincher according to the present invention.

Now, referring to FIG. 4, the stitching clincher mainly comprises a stationary upper clincher (15) and an oscillating low clincher (16) attached to the upper clincher (15). Said upper clincher (15) and a lower end of the stitching head (7) are designed to be brought in contact with each other. Said stitching head, the upper clincher (15) and the lower clincher (16) are made from conducting material so that an electric signal can be passed therethrough. The upper clincher (15) having an upper clincher holder-fiber (14) as an electrical insulator. Likewise, the lower clincher (16) is supported by a lower clincher holder-fiber (17) and a clincher back support-fiber (18) as an electrical insulator. Said upper and lower clincher holder fiber (14, 17) isolates the stitching clincher from the machine body.

Figure 5A:
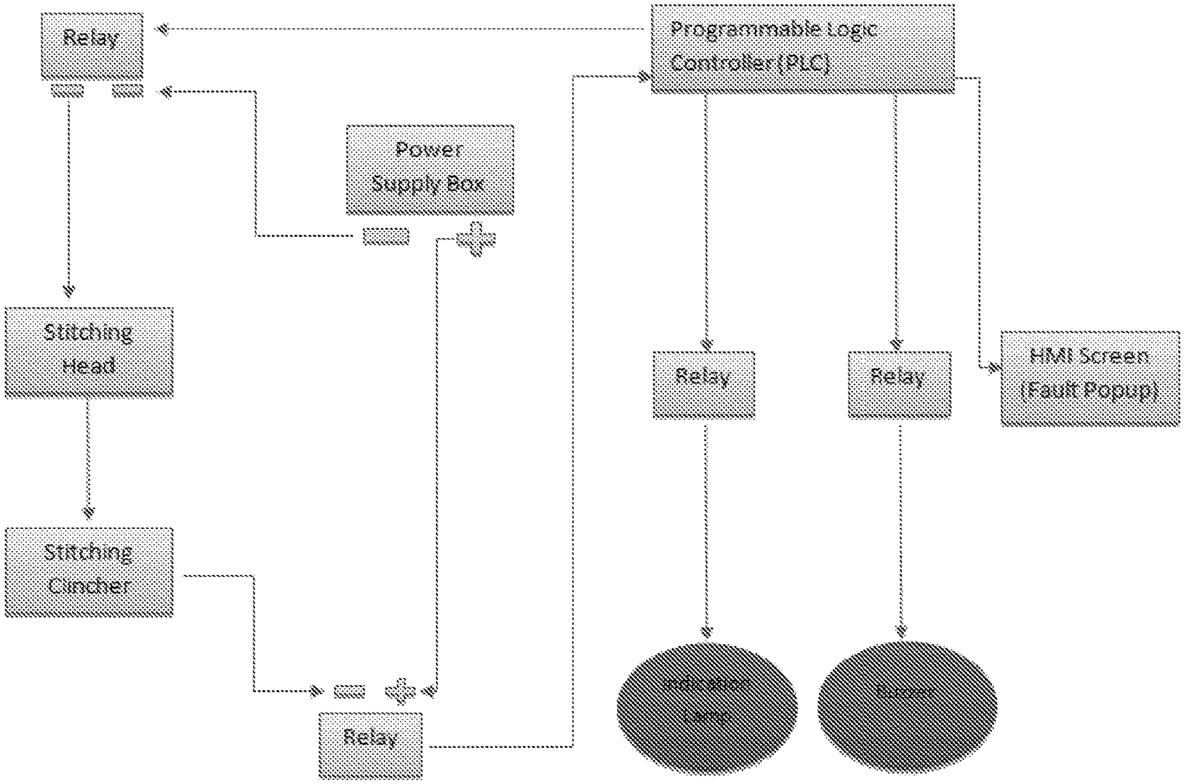
FIG. 5A shows a block diagram of the missing staple pin detection mechanism according to the present invention.

Now referring to FIG. 5A, a power supply box of 12 V DC having a negative terminal and a positive terminal is shown. The relay having a positive terminal and a negative terminal is shown. According to FIG. 5A, the negative terminal of the power supply box is electrically connected to the stitching head (7) and the positive terminal of the power supply box is connected to a positive terminal of a relay. Further, a negative terminal of the relay is connected to the lower clincher (16). Further, the relay is in electrical communication with a PLC (Programmable Logic Controller) for identifying the missing staple. The PLC is also connected to a HMI (Human Machine Interface) screen to show Popup messages and indicates a particular fault. Further, the PLC is configured to provide a signal through a buzzer (11) and indicator lamps (9) located in series on the top frame (3) in case of detection of missing staple pin.

Now, in process for detecting wire staple applied on the set of sheets (13) during stitching, initially the wire (22) is kept in uniform tension throughout its extension from the wire spools (1) to the stitching head (7). During the wire-stitching operation, the sheets (13) are arranged on the stitching area (6) between the stitching head (7) and the stitching clincher. Now, when the set of sheets (13) is sensed to position below stitching head (7), the stitching head (7) moves down and bends cut wire into U-shape and drives the U-shape wire into the set of sheets (13) and the upper clincher (15) bends both ends of U-shape wire to form a staple on the set of sheets (13).

At the same time, the negative supply through the negative terminal of the power supply box is given to the stitching head (7) through relay for short time duration. Hence, at time of pinning (stapling) operation, the stitching head (7) and the upper clincher (15) comes in contact with each other through the U shape wire. Hence, due to metallic contact between stitching head (7) and the upper clincher (15), the negative supply is passed from the stitching head (7) to the upper clincher (15) and the upper clincher (15) to lower clincher (16) which is electrically connected with the relay. Hence, the circuit for providing an electrical signal to the relay from the power supply box is completed. Now, the relay getting ON and the PLC get input signal for successful stapling operation.

Figure 5B:
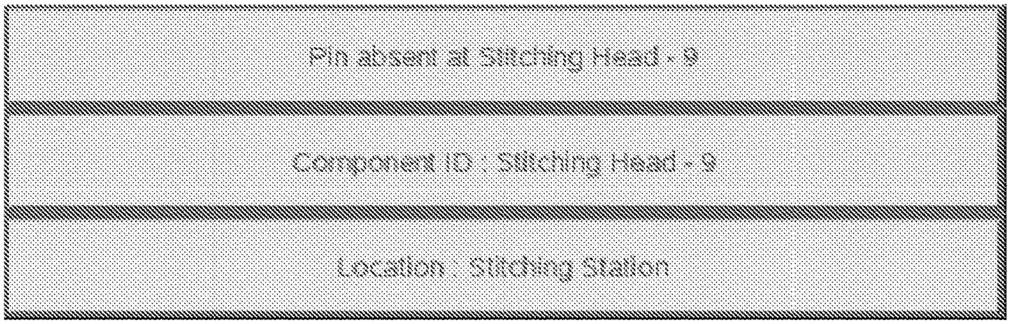
FIG. 5B shows an HMI screen showing missing staple detection results according to the present invention.

However, if, during stapling operation, the stitching head doesn't come in contact with the upper clincher (15) through the stapling wire (22), the staple operation will not be executed. The power supply doesn't provide the electrical signal to the relay. Hence, the circuit for providing the electrical signal to the relay from the power supply box will not be completed. In such circumstances, the relay will not be activated. Therefore, the relay is unable to send signal to the PLC. Hence, if the pinning is not done, the input signal will not come at the PLC and accordingly, PLC is configured to generate fault signal if the negative supply from the stitching head being not supplied to the relay through the stitching clincher and shows on HMI screen as shown in FIG. 5B. The PLC also generates output of particular indication lamp (9) for pin absent fault and the indication lamp (9) continuous ON, until proper pinning not done. Further, when such fault occurs, the time buzzer (11) signaling which is mounted at stitching unit till next pin comes. Thus, when a detection signal from the relay is not sent out, it shows abnormality in stapling is detected.

As per the above explanation, on the detection of missing staple pin, the indication lamp (9) continue ON for particular stitching head (7) to identify the error. Hence, by present invention, the operator can easily find a missing staple of the paper sheets. Thus, the present invention provides a 100% error free fault detection of stapling operation.

All substitution, alterations and modification of the present invention which come within the scope of the following claims are to which the present invention is readily susceptible without departing from the spirit of the invention. The scope of the invention should therefore be determined not with reference to the above description but should be determined with reference to appended claims along with full scope of equivalents to which such claims are entitled.

LIST OF REFERENCE NUMERALS

Wire spools (1)
Guide Channel (2)
Top frame (3)
Wire Puller Servo (4)
Lower Platform (5)
Stitching Area (6)
Stitching Heads (7)
Stitching Head Numbers (8)
Indicator Lamps (9)
Spindle (10)
Buzzer Light (11)
Operating Panel (12)
Sheets (13)
Upper Clincher Holder-Fiber (14)
Upper Clincher (15)
Lower Clincher (16)
Lower Clincher Holder-Fiber (17)
Clincher Back Support-Fiber (18)
Puller roller (19)
Stitching Head Holder-Metallic (oscillating) (20)
Stitching Head Holder-Metallic (Fixed) (21)
Wire (22)

I claim:

1. A wire stitching apparatus with missing staple pin detection mechanism comprising:

a wire spool (1) loaded with a wire (22);

a stitching clincher having an upper clincher (15) and a lower clincher (16) attached to the upper clincher (15);

a stitching head (7) arranged oppositely to the upper clincher (15) for reciprocal vertical movement between a stand by position in which it is upwardly separated from the clincher and a stitching position in which it abuts the upper clincher (15);

a power supply box having a positive terminal and negative terminal; said power supply is configured to provide an electrical signal to a relay;

said relay having a positive terminal and a negative terminal; the relay is in electrical communication with a PLC (Programmable Logic Controller);

the stitching head (7) is configured to receive required length of wire (22) from the spool (1) and applied the wire (2) into a set of sheets (13) to form a staple;

Characterized in that, the negative terminal of the power supply box is electrically connected to the stitching head (7) and the positive terminal of the power supply box is connected to the positive terminal of the relay;

the negative terminal of the relay is connected to the lower clincher (16);

the power supply box provides the electrical signal to the relay when the upper clincher (15) and the stitching head (7) being brought in contact through the staple wire (22) inserted into the set of sheets (13) to determine the successful stapling;

the power supply doesn't provide the electrical signal to the relay if the upper clincher (15) and the stitching head (7) not brought in contact to determine the missing of stapling.

2. A wire stitching apparatus with missing staple pin detection mechanism as claimed in claim 1, the relay is configured to provide the electrical signal to the PLC to determine the successful stapling.

3. A wire stitching apparatus with missing staple pin detection mechanism as claimed in claim 1, the PLC is configured for an indication through an indicator lamp (9) or buzzer (11) in absence of the electrical signal from the relay to determine the missing staple.

4. A wire stitching apparatus with missing staple pin detection mechanism as claimed in claim 1, the PLC is connected to a HMI screen to show popup message and indicates a particular fault.

5. A wire stitching apparatus with missing staple pin detection mechanism as claimed in claim 1, the stitching head (7) and the stitching clinchers are preferably made of conducting material.

6. A method of operating wire stitching apparatus with missing staple pin detection mechanism comprises of following steps:

a) delivering wire (22) from a spool (1) to a stitching head (7) through a puller roller (19);

b) placing set of sheets (13) on a stitching area (6) between a stitching head (7) and a upper clincher (15);

c) moving stitching head (7) to abuts against the upper clincher (15) to perform stapling on the set of sheets (13);

d) simultaneously passing the negative supply from the power supply box to the stitching head (7);

e) passing the negative supply from the stitching head (7) to the upper clincher (15) and the upper clincher (15) to lower clincher (16) if the stitching head (7) and the upper clincher (15) comes in contact through a staple wire (22);

f) passing the negative supply from the lower clincher (16) to a relay to provide an electrical signal to the relay;

g) sending the electrical signal from the relay to a PLC to determine the successful stapling operation.

7. The method of detecting missing staple pin as claimed in claim 6, wherein the PLC is configured to generate fault signal if the negative supply from the stitching head (7) being not supplied to the relay from the stitching clincher.

* * * * *